United States Patent [19]
McKnight

[11] Patent Number: 6,088,328
[45] Date of Patent: Jul. 11, 2000

[54] SYSTEM AND METHOD FOR RESTORING FAILED COMMUNICATION SERVICES

[75] Inventor: David W. McKnight, Garland, Tex.

[73] Assignee: Nortel Networks Corporation, Montreal, Canada

[21] Appl. No.: 09/222,029

[22] Filed: Dec. 29, 1998

[51] Int. Cl.[7] .................................................. H04Q 11/00
[52] U.S. Cl. ............................................ 370/216; 379/207
[58] Field of Search ................................... 370/216, 217, 370/218, 219, 242, 220, 244, 410, 522, 221, 223; 379/207, 210, 230

[56] References Cited

U.S. PATENT DOCUMENTS

| | | | |
|---|---|---|---|
| 5,386,544 | 1/1995 | Nakamura | 395/575 |
| 5,465,294 | 11/1995 | Chapman, Jr. et al. | 379/207 |
| 5,537,642 | 7/1996 | Glowny et al. | 395/800 |
| 5,594,942 | 1/1997 | Antic et al. | 455/33.1 |
| 5,623,532 | 4/1997 | Houde et al. | 379/58 |
| 5,627,889 | 5/1997 | Eslambolchi | 379/221 |
| 5,652,908 | 7/1997 | Douglas et al. | 395/800 |
| 5,661,719 | 8/1997 | Townsend et al. | 370/216 |
| 5,712,968 | 1/1998 | Nakayama et al. | 395/182.02 |
| 5,751,789 | 5/1998 | Farris et al. | 379/34 |
| 5,848,128 | 12/1998 | Frey | 379/9 |

*Primary Examiner*—Chau Nguyen
*Assistant Examiner*—Forood Boortalary
*Attorney, Agent, or Firm*—Carr & Storm, L. L. P.; Jack D. Stone, Jr.

[57] ABSTRACT

A system and method for restoring telephone and data communication services provided by a primary computing resource when such primary computing resource fails, by providing a backup computing resource and restoration software having means which uses a heartbeat and challenge protocol to detect such a failure and to restore such services.

34 Claims, 4 Drawing Sheets

SYSTEM AND METHOD FOR RESTORING FAILED COMMUNICATION SERVICES

TECHNICAL FIELD

The invention relates generally to communication services and, more particularly, to a system and method for restoring telephone and data communication services after such services have failed.

BACKGROUND

Typically, telephone and data services rely on computing resources and internal communication resources, such as buses, to control interface devices of telephone switches (e.g., a signaling system 7 (SS7)), internet protocol (IP) routers, asynchronous transfer mode (ATM) switches, and the like. When such computing resources and internal communications resources fail, then telephone and data services cannot be provided on the interface devices.

Therefore, what is needed is a system and method for restoring telephone and data communications services when such computing resources providing such services fail, so that substantially uninterrupted telephone and data services can be provided over interface devices.

SUMMARY

According to the present invention, telephone and data communication services provided by a primary computing resource are restored when such primary computing resource fails, by providing a backup computing resource and restoration software having control logic which uses a challenge protocol to detect such a failure and to restore such services. The primary and backup computing resources may be located at sites which are separated by substantial distances so that a natural disaster, for example, which destroys one computing resource does not destroy the other computing resource, thereby enabling communication services to be readily restored and to be more reliable.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
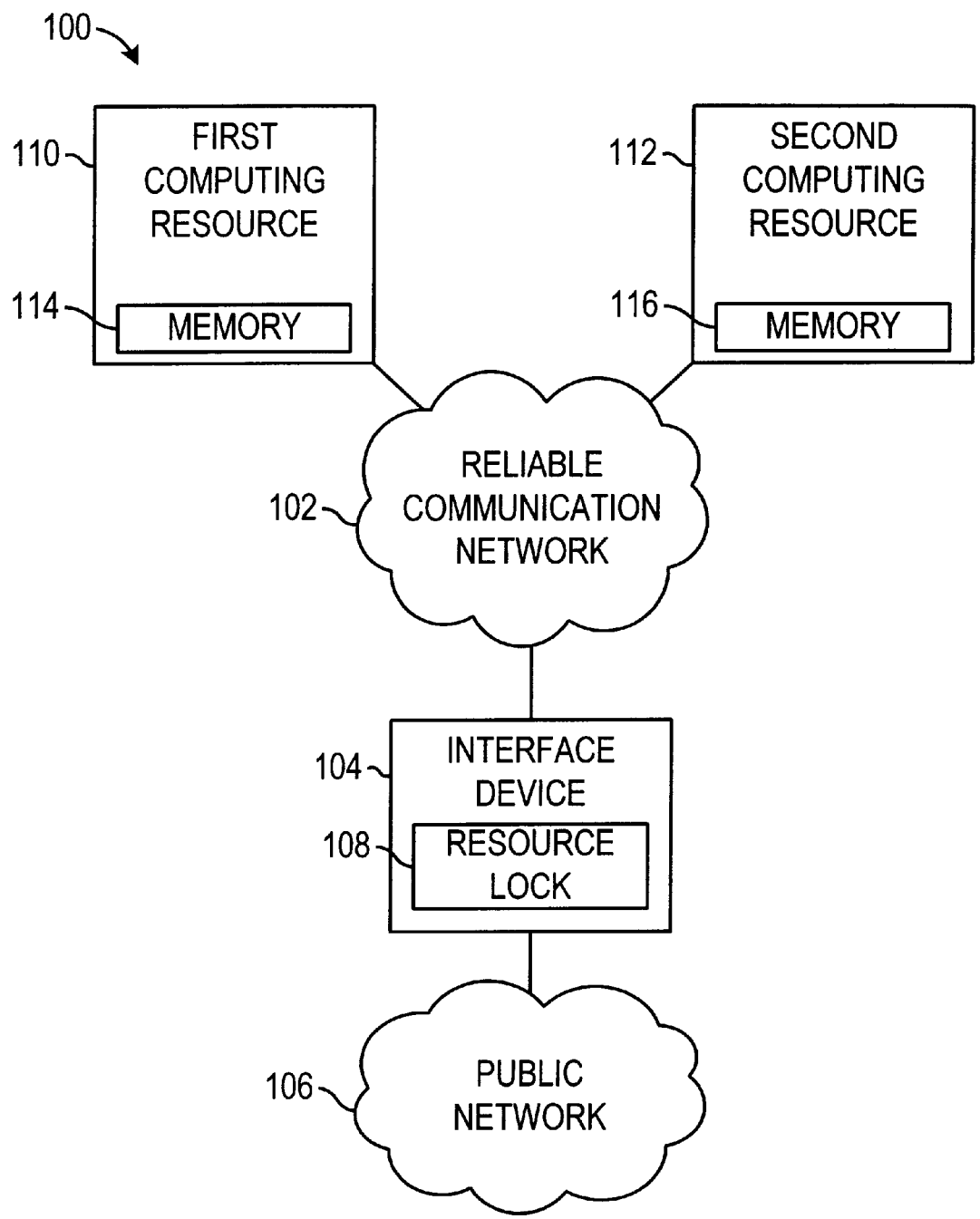
FIG. 1 is a block diagram of a telecommunications system embodying features of the present invention.

In the discussion of the FIGURES, the same reference numerals will be used throughout to refer to the same or similar components. In the interest of conciseness, various other components known to the art, such as asynchronous transfer mode (ATM) switches, Internet Protocol (IP) routers, computing resources, and the like, necessary for the operation of a telecommunications network, have not been shown or discussed in detail.

Referring to FIG. 1 of the drawings, the reference numeral 100 generally designates a telecommunications system embodying features of the present invention. The system 100 includes a communications network 102, such as a private or public data or voice network, including a Local Area Network (LAN), an ATM switch, an IP router, a communications bus cable, a shelf backplane, and the like, effective for providing reliable transport of control signaling and, optionally, bearer traffic between the interface device 104 and computing resources described below.

The communications network 102 is connected through at least one physical interface device 104 to a public network 106, such as a Public Land Mobile Network (PLMN) which may comprise, for example, a conventional telephone, a private branch exchange (PBX), an access tandem, a personal computer (PC) modem, access to the Internet, or the like. The interface device 104 may comprise, for example, an 802.3 interface, a digital service level zero (DSO) interface, an optical carrier (OC), an Asymmetrical Digital Subscriber Line (ADSL), or the like, which is effective for providing ingress and egress points for both control signaling (e.g., ISDN Primary Rate Interface and Basic Rate Interface (PRI/BRI), Signaling System 7 (SS7), Transmission Control Protocol (TCP), and the like) and payload bearer traffic (e.g., Time Division Multiplexing (TDM), Internet Protocol/Asynchronous Transfer Mode (IP/ATM) data packets, and the like). A resource lock 108, described below, resides on the interface device 104.

A first computing resource 110 and a second computing resource 112 are connected to the network 102, the interface device 104, and the resource lock 108 for controlling the interface in a manner described below. The first and second computing resources 110 and 112, respectively, may be located on the same shelf, in the same frame, or anywhere at the same site (i.e., location). Furthermore, the computing resources 110 and 112, as well as the network 102, may also be located at different sites which are separated from one another by distance of about one mile or more, and typically by distance of about ten miles or more and, preferably by distance of about one hundred miles or more.

Each of the first and second computing resources 110 and 112, respectively, preferably comprises a conventional computer mainframe, server, or the like, each of which is independently effective for handling protocols or services (e.g., SS7, BRI, TCP, connection setup, authentication, video on-demand, web pages, and the like) provided on the interface device 104. The first and second computing resources 110 and 112, respectively, include first and second memory units 114 and 116, respectively, for storing a copy of restoration software and data (not shown), discussed below. While not shown, the computing resources 110 and 112 also include a number of other components, such as input and output devices, that are considered to be well-known in the art and are therefore not discussed in further detail herein.

The restoration software stored in each of the memory units 114 and 116 is configured to keep the two computing resources 110 and 112 synchronized with each other by maintaining at all times substantially the same configuration data (e.g., equipment connectivity, operating parameters, subscriber information, and the like) and selected state information (e.g., interface usage state, call progress state such as calling and called addresses, and the like) in each of the memory units 114 and 116. The restoration software also provides for failure detection and restoration through a protocol comprising a "heartbeat" and a challenge, described further below.

In the operation of the system 100 shown in FIG. 1, the first and second computing resources, 110 and 112, respectively, are configured in a manner well known in the art to provide services required on the interface device 104. One of the computing resources 110 or 112 is initially designated by design or by algorithmic selection as a default "primary" computing resource to control and provide preferably all, or alternatively at least a portion, of services required by, the interface device 104. For the purpose of illustration, it will be assumed that the first computing resource 110 is initially designated as the primary computing resource; the second computing resource 112 will then act as a "backup" computing resource to the system 100, as discussed below. An external source, such as a system administrator, provides some state/configuration information, described above, to each of the computing resources 110 and 112, which is stored in the memory units 114 and 116, respectively. The first (primary) computing resource 110 initially controls the interface device 104 and provides all or a portion of the services on the interface device 104 in a manner well known to those skilled in the art. The first (primary) computing resource 110 also sends "heartbeat" signals to the second (backup) computing resource 112 on a predetermined periodic basis, such as every few seconds. optionally, the second (backup) computing resource 110 may also send "heartbeat" signals to the first (primary) computing resource 110 on a predetermined periodic basis to indicate that the second computing resource 112 is available.

Figure 2:
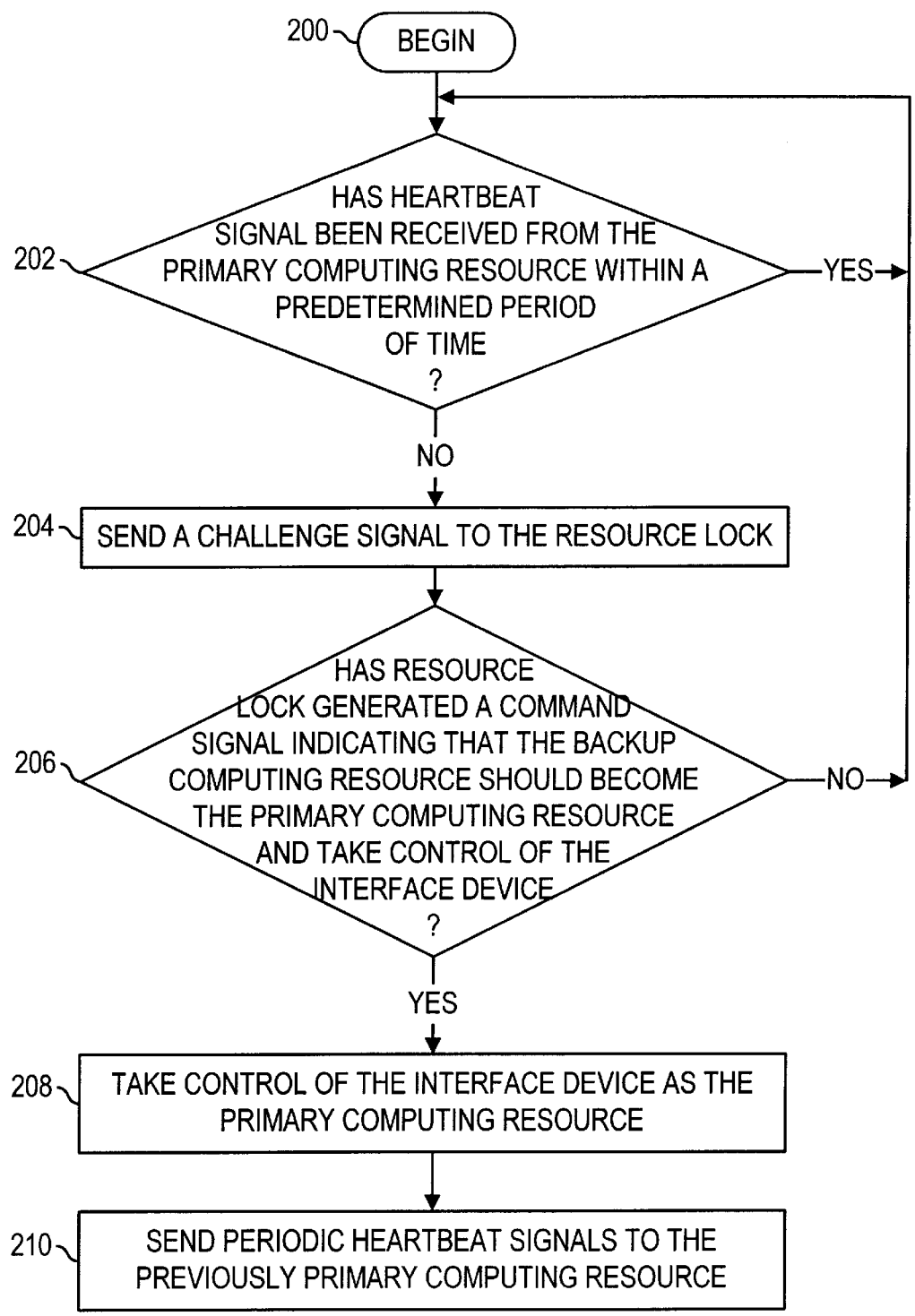
FIG. 2 is a flow chart illustrating operation of a backup computing resource depicted in FIG. 1.

FIG. 2 is a flow chart illustrating control logic implemented by the second computing resource 112 for operation as a backup computing resource in the foregoing system shown in FIG. 1. As depicted in FIG. 2, at step 200, the second computing resource 112 is powered up and, at step 202, a determination is made whether the second computing resource 112 has received a heartbeat signal from the first computing resource 110 within a predetermined period of time of, for example, about a few seconds. If, in step 202, a determination is made that the second computing resource 112 has received a heartbeat signal from the first computing resource 110 within the predetermined period of time, then step 202 is repeated; otherwise, execution proceeds to step 204.

In step 204, the second computing resource 112 sends a challenge signal to the resource lock 108. The resource lock 108 proceeds according to control logic discussed below with respect to FIG. 3. In step 206, a determination is made whether the second (backup) computing resource 112 has received a signal back from the resource lock 108 indicating that the first (primary) computing resource 110 has failed, and directing the second computing resource 112 to be the primary computing resource and, accordingly, to control the interface device 104 and to provide on the interfaces the services required. If, in step 206, the second computing resource 112 does not receive such a signal from the resource lock 108, then execution returns to step 202; otherwise, execution proceeds to step 208.

In step 208, the second computing resource 112 takes control of interface device 104 as the primary computing resource, and provides services required on the interface device 104. In step 210, the second computing resource 112, as the primary computing resource, sends periodic heartbeat signals to the first computing resource 110, the new backup computing resource. It is understood that the first computing resource 110 may not receive the heartbeat signals sent by the second computing resource 112 until the operation of the first computing resource 110 is restored. Additionally, the first (primary) computing resource 110 will be prevented from providing services on the interface device 104 by logic programmed into the interface that permits control signals to flow only between the computing resource designated as the primary computing resource and the interface device 104.

Figure 3:
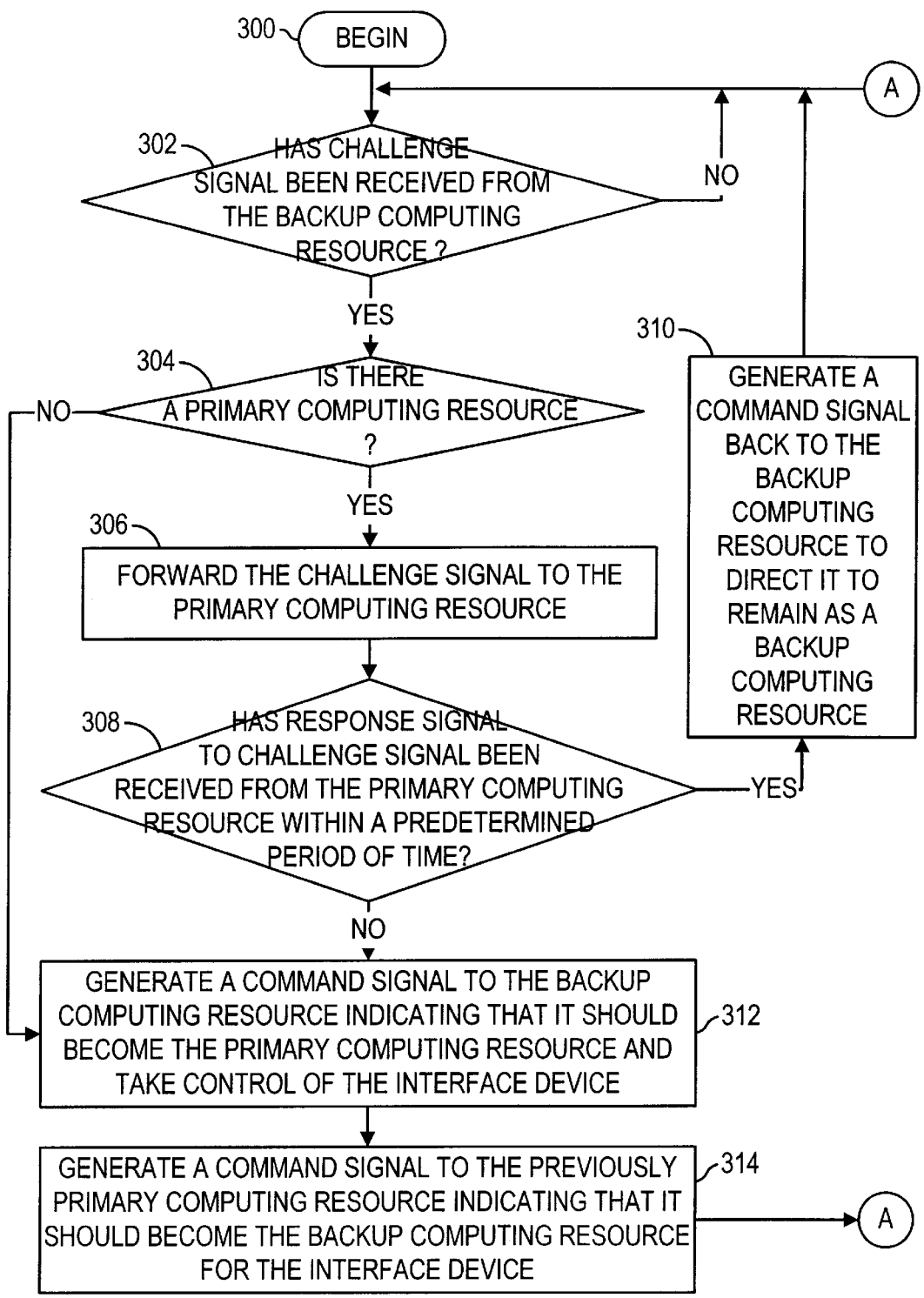
FIG. 3 is a flow chart illustrating operation of a resource lock depicted in FIG. 1.

FIG. 3 is a flow chart illustrating control logic implemented by the resource lock 108 for determining when the acting backup computing resource becomes the acting primary computing resource. Accordingly, in step 300, power is applied to the resource lock 108 and, in step 302, a determination is made whether a challenge signal has been received from the second (backup) computing resource 112 in step 204, described above with respect to FIG. 2. If, in step 302, it is determined that a challenge signal has not been received from the second (backup) computing resource 112 in step 204, then step 302 is repeated; otherwise, execution proceeds to step 304.

In step 304, a determination is made whether a primary computing resource, such as the first computing resource 110, exists. If it is determined that a primary computing exists, then execution proceeds to step 306; otherwise, execution proceeds to step 312, discussed below.

In step 306, the resource lock 108 forwards the challenge signal to the first (primary) computing resource 110. In step 308, a determination is made whether the first (primary) computing resource 110 has responded to the challenge signal within a predetermined period of time of, for example, about a few seconds. If, in step 308, it is determined that the first (primary) computing resource 110 has responded to the challenge signal within a predetermined period of time, then execution proceeds to step 310; otherwise, execution proceeds to step 312 wherein execution proceeds on the basis that the first (primary) computing resource has failed. In step 310, the resource lock 108 generates a command signal back to the backup computing resource 112 directing it to remain as a backup computing resource. Upon completion of step 310, execution returns to step 302.

In step 312, the resource lock 108 generates a signal to the second computing resource 112 directing it to become the primary computing resource and, accordingly, to control the interface device 104, and to provide services required on the interface. In step 314, the resource lock 108 generates a signal to the first computing resource 110 directing it to become the backup computing resource to the interface device 104. Execution may optionally bypass step 314. Upon execution of step 314 or, if step 314 is optionally bypassed, upon execution of step 312, execution returns to step 302.

By the use of the present invention as shown in FIGS. 1–3, primary and backup computing resources may be located substantial distances from a network and associated interfaces, so that if one computing resource becomes inoperable due, for example, to natural disaster such as flood, tornado, earthquake, or to manmade causes such as sabotage, accident, or war, then the backup computing resource may continue to provide service through the interface.

It is understood that the present invention can take many forms and embodiments. Accordingly, several variations may be made in the foregoing without departing from the spirit or the scope of the invention. For example, the backup computing resource may not be provided with configuration data and state information until the backup computing resource is needed. While such an arrangement would not be quite as responsive as, and therefore have slower recovery times than, the arrangement described above with respect to FIGS. 1–3, it would not demand as much processing time by the backup computing resource during the vast majority of the time that it is in only a standby mode. Furthermore, in many cases, there may be an array of different computing resources available that could provide backup services. By waiting until a primary computing resource fails to provide a backup computing resource with configuration data and state information, greater flexibility would be provided by the array of computing resources, and a decision about which computing resource to use as a backup could be made based on which computing resource is most available when it is needed.

In another example, a computing resources may serve as a primary computing resource for one or more of a plurality of interface devices, and as a backup computing resource for one or more other interface devices.

Figure 4:
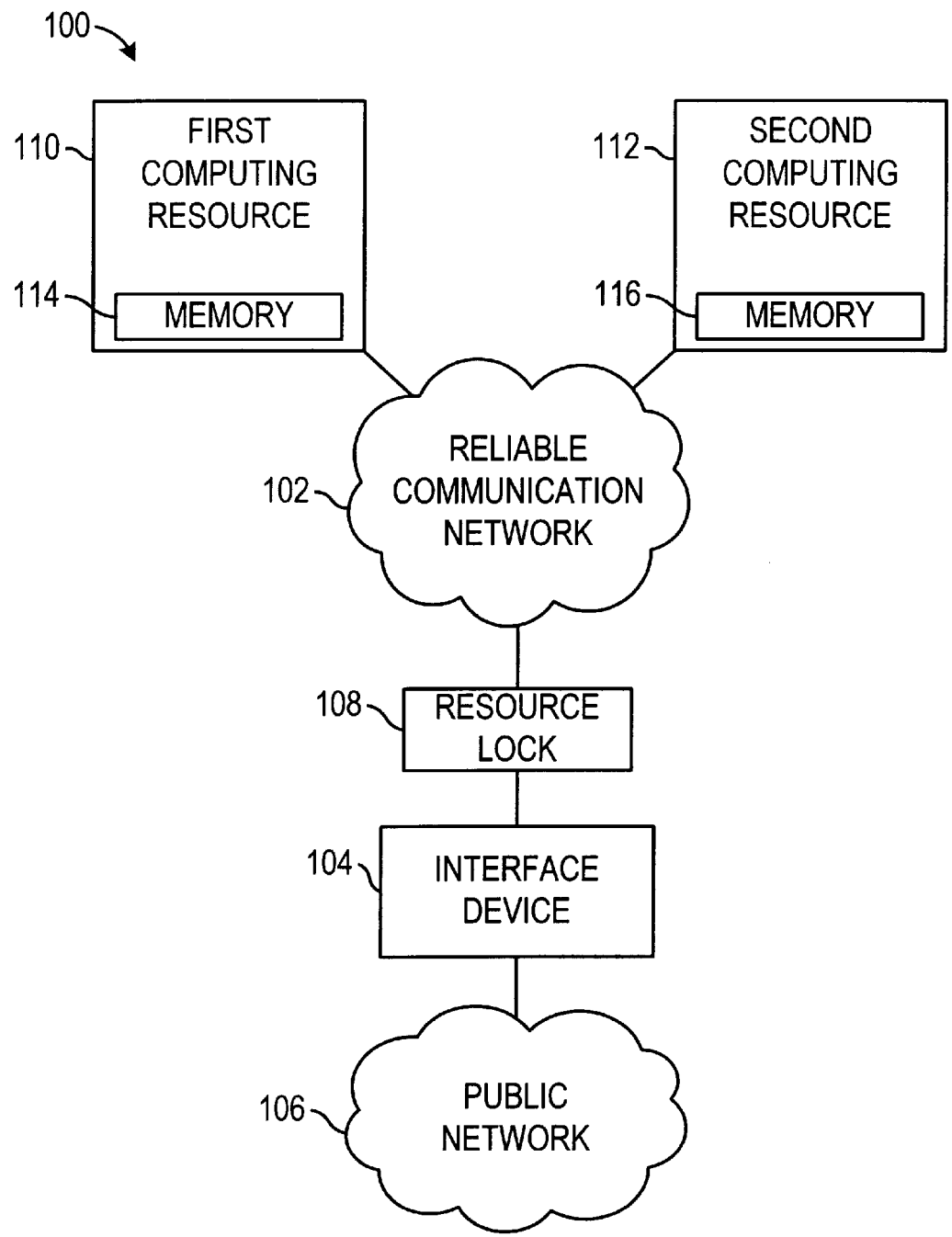
FIG. 4 is a block diagram of a telecommunications system embodying features of an alternate embodiment of the present invention.

In still another example, the resource lock 108 may be physically and/or logically separated from the interface device 104. Accordingly, as exemplified in FIG. 4, the resource lock 108 is positioned between the network 102 and the interface device 104 to filter messages, such as lock challenges and responses, from the interface device, and/or to forward selected messages from the computing resources 110 and 112 to the interface device 104. The interface device 104 may thereby be more isolated from the computing resources and enabled to operate more efficiently as an interface device between the communications network 102 and the public network 106. In addition to the advantages discussed above, the embodiment shown in FIG. 4 is useful for adapting commercial interfaces devices that have no lock, or for implementing interface devices which do not utilize a resource but do require authentication and/or unambiguous control.

In still another example, rather than replacing the primary computing resource with the backup computing resource, the processing power of the backup computing resource may also be used to supplement the primary computing resource to thereby improve services provided on the interfaces.

In still another example, the system 100 may operate without the heartbeat signal, by configuring the backup computing resource to periodically generate a challenge signal to the resource lock and await a response back. Such a system may be more responsive to failure of a computing resource because it doesn't wait for some predetermined period of time to first determine that it has not received a heartbeat signal from the primary computing resource before it generates a challenge signal to the resource lock.

In still another example, the interface device 104 may comprise multiple interfaces, each of which interfaces may include a lock, each of which locks may have different owners which control the lock.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for restoring failed telephone and data communication services provided by an interface device to a public network, the method comprising:

a) connecting the interface device through a reliable communication network to a first computing resource and to a second computing resource;

b) configuring the first computing resource as a primary computing resource to provide through the communication network to the interface device at least a portion of the communication services provided by the interface device to the public network;

c) configuring the second computing resource as a backup computing resource to provide through the communication network to the interface device at least the portion of the communication services provided by the first computing resource through the communication network to the interface device should the first computing resource fail;

d) configuring the second computing resource to generate a challenge signal to a resource lock;

e) configuring the resource lock to forward the challenge signal to the first computing resource, in response to receipt of the challenge signal from the second computing resource;

f) configuring the resource lock to generate to the second computing resource a command signal directing the second computing resource to be the primary computing resource and to provide at least the portion of the communication services provided by the first computing resource through the communication network to the interface device, in response to a failure by the resource lock to receive from the first computing resource a response signal to the challenge signal.

2. The method of claim 1 further comprising configuring the first computing resource to periodically generate a heartbeat signal to the second computing resource; and wherein the step of configuring the second computing resource to generate a challenge signal to a resource lock further comprises configuring the second computing resource to generate a challenge signal to a resource lock, in response to failure by the second computing resource to receive a heartbeat signal from the first computing resource.

3. The method of claim 1 wherein the communications network is located at a first site, and the step of providing a first computing resource comprises providing a first computing resource at a second site, and the step of providing a second computing resource comprises providing a second computing resource at a third site.

4. The method of claim 1 wherein the communications network is located at a first site, and the step of providing a first computing resource comprises providing a first computing resource at a second site, and the step of providing a second computing resource comprises providing a second computing resource at a third site, wherein the distance between the first site and the second site exceeds about one mile, the distance between the second site and the third site exceeds about one mile, and the distance between the third site and the first site exceeds about one mile.

5. The method of claim 1 further comprising configuring the resource lock to generate to the first computing resource a command signal directing the first computing resource to be the backup computing resource and to provide at least the portion of the communication services provided by the second computing resource through the communication network to the interface device, in response to a failure by the resource lock to receive from the first computing resource a response signal to the challenge signal.

6. The method of claim 1 further comprising the steps of providing to the first computing resource and to the second computing resource substantially current configuration data about the interface and the communications network.

7. The method of claim 1 further comprising the step of providing to the first computing resource and to the second computing resource state information and configuration data describing at least one of equipment connected to the interface and/or communications network, operating parameters of the interface and/or communications network, and information about subscribers to the interface and/or communications network.

8. The method of claim 1 wherein the communication services comprise at least one of integrated services digital network, (ISDN), Internet protocol (IP), a firewall, a router, H.323, or an asynchronous transfer mode (ATM) user network interface (UNI).

9. The method of claim 1 further comprising interconnecting the communications network to a third computing resource to carry signals between the first interface, the second interface, the first computing resource, the second computing resource, and the third computing resource; and configuring the third computing resource to be able to provide the communication services through the communications network and t he interface to the public network should the first computing resource or the second computing resource fail.

10. A method for restoring failed telephone and data communication services between a first point of presence (POP) and a second POP, the method comprising:

a) providing a first remotely controllable interface interconnecting for signal communication the first POP to a communications network;

b) providing a second remotely controllable interface interconnecting for signal communication the second POP to the communications network;

c) interconnecting the communications network to a first computing resource and to a second computing resource to carry signals between the first interface, the second interface, the first computing resource, and the second computing resource;

d) configuring the first computing resource to provide the communication services through the network and the interface to the first POP and the second POP;

e) configuring the second computing resource to generate a challenge signal to a resource lock;

f) configuring the resource lock to forward the challenge signal to the first computing resource in response to receipt of the challenge signal from the second computing resource;

g) configuring the resource lock to generate a command signal to the second computing resource in response to a failure by the resource lock to receive from the first computing resource a response signal to the challenge signal; and h) configuring the second computing resource to provide the communication services through the network and the interface to the first POP and the second POP, in response to receipt of the command signal.

11. The method of claim 10 further comprising configuring the first computing resource to periodically generate a heartbeat signal to the second computing resource; and wherein the step of configuring the second computing resource to generate a challenge signal to a resource lock further comprises configuring the second computing resource to generate a challenge signal to a resource lock, in response to a failure by the second computing resource to periodically receive the heartbeat signal from the first computing resource.

12. The method of claim 10 wherein the communications network is located at a first site, and the step of providing a first computing resource comprises providing a first computing resource at a second site, and the step of providing a second computing resource comprises providing a second computing resource at a third site.

13. The method of claim 10 wherein the communications network is located at a first site, and the step of providing a first computing resource comprises providing a first computing resource at a second site, and the step of providing a second computing resource comprises providing a second computing resource at a third site, wherein the distance between the first site and the second site exceeds about one mile, the distance between the second site and the third site exceeds about one mile, and the distance between the third site and the first site exceeds about one mile.

14. The method of claim 10 further comprising the step of providing to the first computing resource configuration data about the interface and the communications network, and wherein the step of configuring the second computing resource to provide the communication services through the network and the interface to the first POP and the second POP further comprises providing to the second computing resource current configuration data.

15. The method of claim 10 further comprising the step of providing to the first computing resource state information and configuration data describing at least one of equipment connected to the interface and/or communications network, operating parameters of the interface and/or communications network, and information about subscribers to the interface and/or communications network, and wherein the step of configuring the second computing resource to provide the communication services through the network and the interface to the first POP and the second POP further comprises providing to the second computing resource current state information and configuration data describing at least one of equipment connected to the interface and/or communications network, operating parameters of the interface and/or communications network, and information about subscribers to the interface and/or communications network.

16. The method of claim 10 wherein the communication services comprise at least one of integrated services digital network, (ISDN), Internet protocol (IP), a firewall, a router, H.323, or an asynchronous transfer mode (ATM) user network interface (UNI).

17. The method of claim 10 further comprising interconnecting the communications network to a third computing resource to carry signals between the first interface, the second interface, the first computing resource, the second computing resource, and the third computing resource; and configuring the third computing resource to be able to provide the communication services through the network and the interface to the first POP and the second POP should the first computing resource or the second computing resource fail.

18. A system for restoring failed telephone and data communication services between a first point of presence (POP) and a second POP, the system comprising:

a) a first remotely controllable interface interconnected for signal communication between the first POP and a communications network;

b) a second remotely controllable interface interconnected for signal communication between the second POP and the communications network;

c) a first computing resource and a second computing resource interconnected to the communications network for signal communication between the first interface, the second interface, the first computing resource, and the second computing resource, wherein the first computing resource is configured to provide the communication services through the network and the interface to the first POP and the second POP, and the second computing resource is configured to be able to provide the communication services through the network and the interface to the first POP and the second POP;

d) means for the second computing resource to generate a challenge signal to a resource lock;

e) means for forwarding to the first computing resource a challenge signal received by the resource lock from the second computing resource; and f) means, responsive to a failure by the first computing resource to generate a signal responsive to the challenge signal, for designating the second computing resource to provide the communication services through the network and the interface to the first POP and the second POP.

19. The system of claim 18 further comprising means for configuring the first computing resource to periodically generate a heartbeat signal to the second computing resource; and wherein the means for the second computing resource to generate a challenge signal to a resource lock further comprises means for the second computing resource to generate a challenge signal to a resource lock upon failure of the second computing resource to periodically receive a heartbeat signal from the first computing resource.

20. The system of claim 18 wherein the first computing resource is located at a first site, the second computing resource is located at a second site, and the communications network is located at at least a third site.

21. The system of claim 18 wherein the first computing resource is located at a first site, the second computing resource is located at a second site, and the communications network is located at at least a third site, and wherein the distance between the first site and the second site exceeds about one mile, the distance between the second site and the third site exceeds about one mile, and the distance between the third site and the first site exceeds about one mile.

22. The system of claim 18 further comprising substantially the same configuration data stored in the first computing resource and the second computing resource about the interface and the communications network.

23. The system of claim 18 further comprising state information and configuration data stored in the first computing resource and the second computing resource, wherein the state information and configuration data describes at least one of equipment connected to the interface and/or communications network, operating parameters of the interface and/or communications network, and information about subscribers to the interface and/or communications network.

24. The system of claim 18 wherein the communication services comprise at least one of integrated services digital network, (ISDN), Internet protocol (IP), a firewall, a router, H.323, or an asynchronous transfer mode (ATM) user network interface (UNI).

25. A system for restoring failed telephone and data communication services between a first point of presence (POP) and a second POP, the system comprising:

a) a first remotely controllable interface interconnected for signal communication between the first POP to a communications network;

b) a second remotely controllable interface interconnected for signal communication between the second POP to the communications network;

c) a first computing resource and a second computing resource interconnected to the communications network for signal communication between the first interface, the second interface, the first computing resource, and the second computing resource, wherein the first computing resource is configured to provide the communication services through the network and the interface to the first POP and the second POP;

d) means for the second computing resource to generate a challenge signal to a resource lock;

e) means for forwarding to the first computing resource a challenge signal received by the resource lock from the second computing resource; and f) means, responsive to a failure by the first computing resource to generate a signal responsive to the challenge signal, for configuring the second computing resource to provide the communication services through the network and the interface to the first POP and the second POP.

26. The system of claim 25 further comprising means for configuring the first computing resource to periodically generate a heartbeat signal to the second computing resource; and wherein the means for the second computing resource to generate a challenge signal to a resource lock further comprises means for the second computing resource to generate a challenge signal to a resource lock upon failure of the second computing resource to periodically receive a heartbeat signal from the first computing resource.

27. The system of claim 25 wherein the first computing resource is located at first site, the second computing resource is located at a second site, and the communications network is located at at least a third site.

28. The system of claim 25 wherein the first computing resource is located at a first site, the second computing resource is located at a second site, and the communications network is located at at least a third site, and wherein the distance between the first site and the second site exceeds about one mile, the distance between the second site and the third site exceeds about one mile, and the distance between the third site and the first site exceeds about one mile.

29. The system of claim 25 further comprising configuration data stored in the first computing resource about the interface and the communications network, and wherein the means responsive to a determination that the first computing resource does not generate a signal to the resource lock within a predetermined period of time is further configured to store in the second computing resource the configuration data stored in the first computing resource.

30. The system of claim 25 further comprising state information and configuration data stored in the first computing resource, wherein the state information and configuration data describes at least one of equipment connected to the interface and/or communications network, operating parameters of the interface and/or communications network, and information about subscribers to the interface and/or communications network, and wherein the means responsive to a determination that the first computing resource does not generate a signal to the resource lock within a predetermined period of time is further configured to store in the second computing resource the state information and configuration data stored in the first computing resource.

31. The system of claim 25 wherein the communication services comprise at least one of integrated services digital network, (ISDN), Internet protocol (IP), a firewall, a router, H.323, or an asynchronous transfer mode (ATM) user network interface (UNI).

32. The system of claim 25 further comprising a third computing resource interconnected to the communications network for the transmission of signals between the first interface, the second interface, the first computing resource, the second computing resource, and the third computing resource; and wherein the third computing resource is configured to be able to provide the communication services through the network and the interface to the first POP and the second POP should the first computing resource or the second computing resource fail.

33. A method for determining when a backup computing resource should replace a primary computing resource for providing telephone and data communication services between a first point of presence (POP) and a second POP, the resource lock comprising:

a) interconnecting a resource lock to the primary computing resource and to the backup computing resource;

b) configuring the resource lock to await a challenge signal from the backup computing resource;

c) configuring the resource lock to forward the challenge signal to the first computing resource, in response to receipt of the challenge signal from the second computing resource; and d) configuring the resource lock to generate to the second computing resource a command signal directing the second computing resource to provide the communication services through the network and the interface to the first POP and the second POP, in response to a failure by the resource lock to receive from the first computing resource a response signal to the challenge signal.

34. A device configured for determining when a backup computing resource should replace a primary computing resource for providing telephone and data communication services between a first point of presence (POP) and a second POP, the resource lock comprising:

a) a resource lock interconnected to the primary computing resource and to the backup computing resource;

b) means for awaiting a challenge signal generated from the backup computing resource;

c) means for forwarding the challenge signal from the resource lock to the first computing resource, in response to receipt of the challenge signal :from the second computing resource; and d) means for generating to the second computing resource a command signal directing the second computing resource to provide the communication services through the network and the interface to the first POP and the second POP, in response to a failure by the resource lock to receive from the first computing resource a response signal to the challenge signal.

* * * * *

UNITED STATES PATENT AND TRADEMARK OFFICE
CERTIFICATE OF CORRECTION

PATENT NO. : 6,088,328
DATED : July 11, 2000
INVENTOR(S) : McKnight

It is certified that error appears in the above-identified patent and that said Letters Patent is hereby corrected as shown below:

Column 3, line 23   Delete "optionally" and insert --Optionally--

Column 4, line 18   After "computing", insert --resource--

Column 5, line 12   Delete "resources" and insert --resource--

Column 5, line 29   Delete "interfaces" and insert --interface--

Column 7, line 23   Delete "t he" and insert --the--

Column 10, line 29  After "at", insert --a--

Column 12, line 16  Delete ":from" and insert --from--

Signed and Sealed this

First Day of May, 2001

Attest:

NICHOLAS P. GODICI

Attesting Officer            Acting Director of the United States Patent and Trademark Office